United States Patent
Bruckmann

(10) Patent No.: US 8,304,518 B2
(45) Date of Patent: Nov. 6, 2012

(54) METHOD FOR THERMALLY TREATING POLYESTER PELLETS TO OBTAIN A PARTIAL CRYSTALLIZATION

(75) Inventor: Theodor Bruckmann, Greven-Gimbte (DE)

(73) Assignee: BKG Bruckmann & Kreyenborg Granuliertechnik GmbH, Muenster (DE)

( * ) Notice: Subject to any disclaimer, the term of this patent is extended or adjusted under 35 U.S.C. 154(b) by 0 days.

(21) Appl. No.: 13/092,621

(22) Filed: Apr. 22, 2011

(65) Prior Publication Data

US 2011/0201776 A1 Aug. 18, 2011

Related U.S. Application Data

(63) Continuation of application No. 11/915,976, filed on Nov. 29, 2007, now abandoned, and a continuation-in-part of application No. 10/962,614, filed on Oct. 13, 2004.

(30) Foreign Application Priority Data

Jun. 1, 2005 (DE) .......................... 10 2005 025 111
Jun. 8, 2005 (DE) .......................... 10 2005 026 354

(51) Int. Cl.
C08F 6/00 (2006.01)

(52) U.S. Cl. ..... 528/503; 528/271; 528/272; 528/308.3; 528/308.8; 528/480; 422/129; 422/131; 422/245.1; 422/286; 425/308; 264/142

(58) Field of Classification Search ................... 264/142, 264/234; 425/205, 308; 528/308.1, 308.2, 528/308.3, 308.4, 308.5, 308.6, 308.7, 308.8, 528/481, 483, 499, 503, 212, 272, 480; 422/129, 422/131, 135, 137, 139
See application file for complete search history.

(56) References Cited

U.S. PATENT DOCUMENTS 3,544,525 A * 12/1970 Balint et al. ............... 528/483
2005/0085620 A1* 4/2005 Bruckmann ................ 528/480
* cited by examiner

*Primary Examiner* — Frances Tischler
(74) *Attorney, Agent, or Firm* — Patricia M. Mathers

(57) ABSTRACT

The invention relates to a method for thermally treating polyester pellets to obtain partial crystallization, whereby the polyester melt is supplied to an underwater granulating system and granulated; the thus obtained granulate are fed from the underwater granulating system into a water-solids separator. The dried granulate is then fed into a treatment device at a granulate temperature higher than 100 degrees C., without external energy or heat being supplied. The intrinsic heat of the granulate is used as the heat treatment leading to partial crystallization. The crystallization device is embodied as an at least lightly inclined reactor, into which granulate is fed at a temperature higher than 100 degrees C. The granulate passes through the reactor from the loading point to the discharge point under its own weight and exits the reactor with a temperature higher than 130 degrees C.

6 Claims, 1 Drawing Sheet

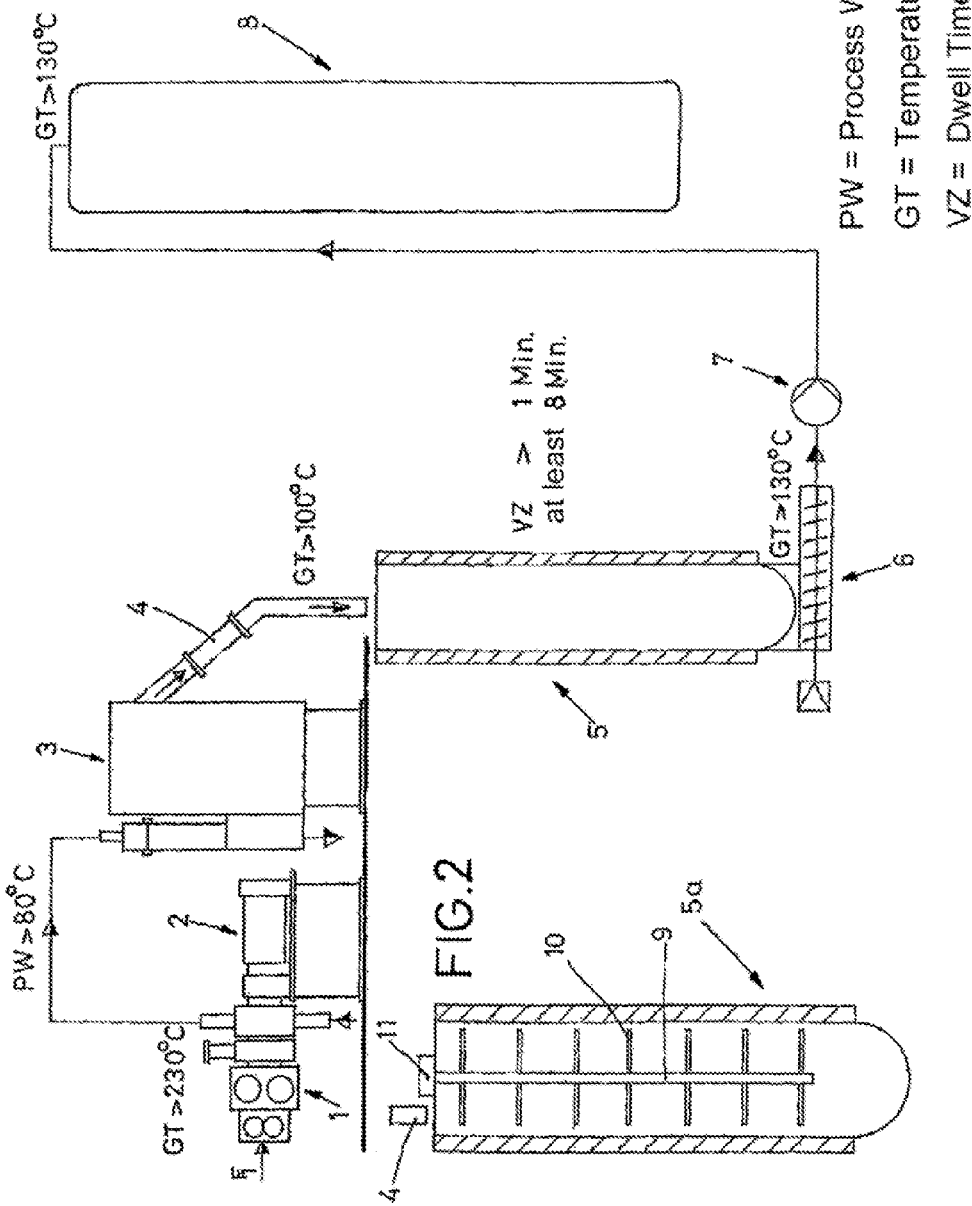

METHOD FOR THERMALLY TREATING POLYESTER PELLETS TO OBTAIN A PARTIAL CRYSTALLIZATION

CROSS-REFERENCE TO RELATED APPLICATIONS

This application is a continuation of application Ser. No. 11/915,976, filed 29 Nov. 2007 and now abandoned, and claims priority from the International Application PCT/DE2006/000454, filed on 15 Mar. 2006, and further is a continuation-in-part of application Ser. No. 10/962,614, filed 13 Oct. 2004.

BACKGROUND INFORMATION

1. Field of the Invention

The invention relates to a method of thermally treating polyester pellets, to obtain a partial crystallization, and apparatus for achieving same. More particularly, the invention relates to a method and apparatus using an underwater granulator.

2. Description of the Prior Art

Aromatic polyesters or co-polyesters, particularly polyethylene terephthalate and its co-polymers, as well as polytrimethylene terephthalate and polyethylene naphthalate, formed into granulates, are the base material for products such as foils, packaging, as well as barrels or containers. All of these polyesters and co-polyesters shall be designated generally as "polyesters" in the description of the present invention.

A conventional method for thermally treating polyester pellets is disclosed in the subsequently published Application Publication WO 2005/044901 A1 (BKG). This method teaches removing water very quickly from the pellets that have just been produced, for example, in an "underwater heat-rejection granulation system," by using the intrinsic heat of the pellets for drying and crystallization. The pellets are transported over a vibrating or swinging conveyor immediately after the water is removed, in order to prevent the pellets from sticking to each other and, after sufficient dwell time, carried or fed to a filling station or a solid-phase poly condenser. With this method, the crystallization process occurs from the inside to the outside of the pellet, which achieves a more even crystallization across the diameter of the pellet or granulate. Thus, this method achieves crystallization exclusively by using the intrinsic heat generated in the liquid state of the polymer. This means that no externally supplied heat is applied to the pellets between granulation and the subsequent filling station or post-processing station. This distinguishes the method according to WO 2005/044901 A1 essentially from conventional methods.

A method of manufacturing polyethylene terephthalate granulates is described in the publication GB 1 250 690 A. According to this method, the base material is produced as in the conventional liquid condensation and fed to an underwater granulator as an approximately 280 degree C. hot polyester liquid. The strand of hot synthetic material that is pressed through a jet is captured and cooled by a water spray coming out of a ring jet. This strand is then fed through an underwater cooling distance to a cutting device. After passing through the cutting device, the granulate material traverses a sieve, by means of which water is separated from solid material. The water is pumped across a cooler in a closed circuit. The wet granulates, after they have been dried, can be put through thermal post-condensation. These granulates, particularly when treated in a thermal post-condensation at greater than 200 degree C., are suitable in their solid state for injection molding.

Essential with this process is that the product that is produced in the strand granulation process, i.e., an underwater cold-rejection granulating system, which is consequently a substantially cooled product, has to be re-heated again, if it is to undergo any further thermal treatment, which includes treatment for the partial crystallization. This requires a substantial amount of energy, which is lost with the preceding cooling method.

U.S. Pat. No. 5,540,868 teaches how to produce crystallized pellets from amorphous polyester, using various granulating methods. The amorphous polyester pre-product has to be heated to temperature greater than 70 degrees C., in order to initiate the crystallization process. Amorphous polyester, however, has a disadvantage in that, when heated to temperatures greater than 70 degrees C., it has a sticky surface. In order to prevent the amorphous polyester from sticking or forming clumps at crystallization temperatures of greater than 70 degrees C., the pre-product has to be in the form of granulates, which can then be held in motion in a cyclone bed reactor by means of streams of hot gas, until the surface has crystallized out enough, so that the pre-product granulates do not stick to each other.

Amorphous polyester is transparent; the crystalline phase, however, clearly shows a white coloration. Normally, the crystallization process of the pre-product is combined with the additional reinforced poly condensation, which is typically carried out at temperatures between 200 and 230 degrees C. in a cyclone bed reactor. This is done to overcome the stickiness of the amorphous polyester. To achieve this, the reactor is operated first at an optimal crystallization temperature of approximately 150 degrees C. for several hours, to overcome the stickiness. Subsequently, the pellets or granulates are condensed for additional hours to higher chain lengths at temperatures between 200 and 230 degrees C.

The method according to the invention is not described in the subsequently published German Application Publication DE 10 2004 050 356 A1. Rather, in the citation, claim 11 recites a post-processing granulating apparatus that includes a heat-insulating container.

Language is provided, shown below, at the end of paragraph 0010 on page 3 that describes which method step is to be performed with this heat-insulating container.

"The hot granulate material can also be stored in a heat-retaining condition, for example, in a heat-insulating container, in order to complete the desired crystallization process."

The granulate material is not transported through the heat-insulating container, but rather, stored in the container, with the hope that this storage will lead to crystallization of the granulates, without the granulates baking and sticking to each other. Furthermore, the granulates should be held in a heat-retaining condition, that is, they should not cool down or heat up.

Aside from the fact that storage of hot granulates leaving the dryer, without a motion device or without a motion of the granulate material itself, will only result in the granulates sticking to each other, the teaching of this reference does not teach the method of the present application.

BRIEF SUMMARY OF THE INVENTION

An object of the invention of the present application is to improve and to simplify the conventional method. This object is achieved by providing a method and a device that uses the intrinsic heat of the pellets from the inside to the outside to effect partial crystallization.

According to the invention, the inventor suggests constructing the treatment apparatus, which is defined in the WIPO Publication WO 2005/0044901 A1 as motion apparatus, as a crystallization reactor that is oriented at least slightly inclined or vertical. According to the inventive method, the pellets, having a temperature of greater than 100 degrees C., are loaded into the reactor, pass through this reactor from the loading point to discharge point, and exit this crystallization area having a temperature greater than 130 degrees C.

"Slightly inclined" means, that the reactor does not stand or lie horizontally, but rather, has an incline relative the horizontal of up to 90 degrees.

It was a surprising discovery to realize that the exothermal process within the reactor prevents a sticking or clumping of the pellets. This is the case even though the pellets are relatively densely packed inside the reactor and pass through the reactor only by force of their own weight. The dwell time of the granulates in the reactor lies between greater than one minute and, preferably, eight minutes. The partially crystallized granulates are then delivered to a subsequent treatment apparatus, for example, to a solid-phase poly condenser, a silo, etc.

The invention relates to a device for carrying out the method. The method provides for a crystallization reactor tube, through which the pellets, based on their own weight, flow from the loading point to the discharge point. The reactor tube can operate with or without baffle devices. The baffle devices have the effect of guiding the granulates and thereby result in a blending or homogenization of the crystallization process. To this end, in accordance with a further embodiment of the invention, a rotating paddle-bearing shaft may be provided within the reactor, to achieve a thorough mixing of the pellets.

Preferably, the reactor is heat-insulated and the granulates are transported between the discharge point of the reactor and the subsequent post-processing apparatus or a silo, for example, by means of a blower that is incorporated into the conveyor tube.

The granulates pass through the reactor densely packed, that is, the volume of granulate material taken from the bottom is continuously being replaced from above. Furthermore, the volume of the granulate material being removed is also adjustable.

BRIEF DESCRIPTION OF THE DRAWINGS

The present invention is described with reference to the accompanying drawings. In the drawings, like reference numbers indicate identical or functionally similar elements.

FIG. 1 illustrates apparatus for thermally treating polyester pellets according to the invention.

FIG. 2 is an illustration of a crystallization reactor.

DETAILED DESCRIPTION OF THE INVENTION

An embodiment of the present invention will now be described more fully in detail with reference to the accompanying drawings. This invention should not, however, be construed as limited to the embodiments set forth herein; rather, they are provided so that this disclosure will be complete and will fully convey the scope of the invention to those skilled in the art.

FIG. 1 shows receiving apparatus 1 that includes a melting pump and a sieve exchanger. Polyester is fed to the receiving apparatus 1, as indicated by feed arrow F1. An underwater heat-rejection granulator 2 is provided at the exit of the sieve exchanger, where round or lentil-shaped granulates are formed. These granulates are delivered by means of process water PW via a conveyor tube to a water-solids separator 3, such as, for example, a centrifuge. The granulates then exit the water-solids separator 3 by means of a conveyor tube 4, the granulates having a temperature greater than 100 degrees C. The granulates are delivered to a crystallization reactor 5, which is shown in the illustrated embodiment as a vertically oriented reactor. A reactor that is slightly inclined may also be provided in a similar manner. The granulates pass through the reactor 5 from the loading point or the loading end to the delivery or discharge end. A conveyor device 6 is provided at the delivery end, as shown in FIG. 1. The conveyor device 6 transports the granulates to a post-processing installation, such as a solid-phase poly condenser 8 by some means, such as, for example, a blower.

FIG. 2 also shows a vertically oriented crystallization reactor 5A, which has a shaft 9 fitted with paddles 10 and which is rotated by means of a drive motor 11. This reactor 5A, too, may also be set up with a slight incline.

In both cases, the reactor 5, 5A is provided with heat insulation, although this is not absolutely necessary.

Temperatures and process times are provided in the FIG. 1, whereby the following designations are used:

PW is temperature of the process water; GT is the temperature of the granulate material; and VZ is the dwell time.

As shown, the temperature of the granulate as it is delivered to the underwater heat-rejection granulator 2 is greater than 230 degrees C. The temperature of the process water PW in the conveyor tube between the granulator 2 and the water-solids separator 3 is greater than 80 degrees C. The granulate material leaves the conveyor 4 with a temperature greater than 100 degrees C.

The dwell time of the granulates in the reactor 5 is greater than one minute and is, preferably, eight minutes.

The temperature of the granulates entering the reactor 5 is greater than 100 degrees C., and is higher than 130 degrees C. at the discharge end of the reactor 5, in order to, for example, subsequently temper the granulates. This temperature is maintained without energy or heat being supplied from an external source.

The temperature of the granulates when entering the solid-phase poly condenser 8 is also preferably greater than 130 degrees C.

These temperatures represent the surface temperature of the granulates.

In one embodiment the crystallization reactor 5 has a height of 1 m, an inner diameter of 270 mm, which tapers to 100 mm at the discharge or delivery end. The discharge opening may also be adjustable in size. The reactor 5 stands vertically, i.e., is vertically oriented.

It is understood that the embodiments described herein are merely illustrative of the present invention. Variations in the application of the method steps or the arrangement of the apparatus for performing said method may be contemplated by one skilled in the art without limiting the intended scope of the invention herein disclosed and as defined by the following claims.

What is claimed is:

1. Method for thermal treatment of polyester pellets, to obtain a partial crystallization, the method comprising the steps of:
   (a) feeding polyester melt to an underwater granulation system and granulating the melt to obtain pellets;

(b) transporting the pellets from the underwater granulation system to a water-solids separator to dry the pellets;
(c) feeding the dried pellets to a crystallization reactor that is at least slightly inclined relative to a horizontal plane, the pellets having a temperature of greater than 100 degrees C.; and
(d) transporting the pellets through the crystallization reactor to a discharge point, wherein the pellets travel through the crystallization reactor only by force of their own weight, the pellets having a temperature of greater than 130 degrees C. at the discharge point, wherein the increase in temperature is a result of the intrinsic heat present in the pellets and no external energy or heat is supplied.

2. The method of claim 1 further comprising the step of:
(e) transporting the pellets from the discharge end of the crystallization reactor to a post-processing installation.

3. The method of claim 2, wherein the post-processing installation is a silo.

4. The method of claim 2, wherein the post-processing installation is a solid-phase poly condenser.

5. The method of claim 1, wherein the crystallization reactor has baffles so as to guide the pellets and facilitate even crystallization.

6. The method of claim 1, wherein the crystallization reactor is inclined 90 degrees relative to a horizontal plane.

* * * * *